(12) United States Patent
Unuma et al.

(10) Patent No.: US 11,269,322 B2
(45) Date of Patent: Mar. 8, 2022

(54) FAILURE DIAGNOSIS SYSTEM

(71) Applicant: Hitachi, Ltd., Tokyo (JP)

(72) Inventors: Munetoshi Unuma, Tokyo (JP); Kohji Maki, Tokyo (JP); Tetsuji Kato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 16/617,084

(22) PCT Filed: Feb. 22, 2018

(86) PCT No.: PCT/JP2018/006545
§ 371 (c)(1),
(2) Date: Nov. 26, 2019

(87) PCT Pub. No.: WO2019/043994
PCT Pub. Date: Mar. 7, 2019

(65) Prior Publication Data
US 2020/0089207 A1    Mar. 19, 2020

(30) Foreign Application Priority Data

Aug. 30, 2017    (JP) .............................. JP2017-165276

(51) Int. Cl.
*G05B 23/02*    (2006.01)

(52) U.S. Cl.
CPC ....... *G05B 23/0283* (2013.01); *G05B 23/021* (2013.01); *G05B 23/0235* (2013.01); *G05B 23/0254* (2013.01)

(58) Field of Classification Search
CPC .............. G05B 23/0283; G05B 23/021; G05B 23/0235; G05B 23/0254; G05B 23/024
See application file for complete search history.

(56) References Cited

U.S. PATENT DOCUMENTS

2010/0023307 A1*  1/2010  Lee ..................... G06K 9/6226
                                                                703/7
2012/0290879 A1   11/2012  Shibuya et al.
(Continued)

FOREIGN PATENT DOCUMENTS

| JP | 2011-070635 A | 4/2011 |
| JP | 5081998 B1 | 11/2012 |
| JP | 5480440 B1 | 4/2014 |

OTHER PUBLICATIONS

International Search Report of PCT/JP2018/006545 dated May 29, 2018.

*Primary Examiner* — Mohammad K Islam
(74) *Attorney, Agent, or Firm* — Mattingly & Malur, PC

(57) ABSTRACT

A failure diagnosis system flexibly responds to a change in a diagnosis target by using a difference in measurement data before and after maintenance in predictive failure diagnosis. A pre-maintenance data DB stores measurement data before maintenance, and a post-maintenance data DB stores measurement data after maintenance. A feature detection algorithm group DB is provided where a plurality of feature detection algorithms are stored. A first feature is detected based on the measurement data by using each of the plurality of feature detection algorithms read from the feature detection algorithm group DB. An algorithm search unit selects one of the plurality of algorithms based on the feature thus detected. A second feature is detected from the measurement data by using the feature detection algorithm, and a sign predictive of failure of diagnosis of target equipment is diagnosed using the detected second feature.

7 Claims, 12 Drawing Sheets

(56) References Cited

U.S. PATENT DOCUMENTS

| | | | |
|---|---|---|---|
| 2013/0073260 A1* | 3/2013 | Maeda | G05B 23/0224 |
| | | | 702/183 |
| 2013/0132000 A1* | 5/2013 | Tamaki | G06F 17/00 |
| | | | 702/35 |
| 2014/0195184 A1* | 7/2014 | Maeda | G05B 21/02 |
| | | | 702/85 |
| 2015/0160098 A1* | 6/2015 | Noda | G05B 23/024 |
| | | | 702/35 |
| 2019/0179297 A1* | 6/2019 | Kuroda | G06N 20/00 |

* cited by examiner ic abnormality diagnosis all the time including the maintenance period, but has no description of construction of a diagnosis model using measurement data before and after maintenance. Any configuration that contributes to the solution of the following problem has not been disclosed accordingly.

FAILURE DIAGNOSIS SYSTEM

TECHNICAL FIELD

The present invention relates to a system for diagnosing a sign predictive of failure in equipment by using data acquired by a sensor before and after maintenance.

BACKGROUND ART

PTL 1 discloses a technique relating to this technical field. Claim 1 of PTL 1 recites a configuration in which "A predictive abnormality diagnosis device comprising time-series data acquisition means for acquiring, from machinery that includes a plurality of devices having sensors installed therein and is kept in operation even during a maintenance period, time-series data containing detection values of the sensors, learning means for generating a feature vector representing a state of the machinery and learning a normal model representing a normal range of the feature vector based on the time-series data acquired by the time-series data acquisition means, and diagnosis means for performing a diagnosis of presence or absence of a sign predictive of abnormality in the machinery based on the normal model, wherein, when a learning period of the normal model includes the maintenance period, the learning means learns the normal model based on time-series data on a device that is kept in operation even during the maintenance period among the plurality of devices, and the diagnosis means continues the diagnosis even during the maintenance period", and in paragraph 0009, an effect is described that "According to the present invention, the predictive abnormality diagnosis device configured to continue a diagnosis even during maintenance of machinery can be provided". That is, PTL 1 discloses the predictive abnormality diagnosis device capable of performing a diagnosis of a sign predictive of abnormality even during maintenance of machinery.

CITATION LIST

Patent Literature

PTL 1: JP 5480440 B1

SUMMARY OF INVENTION

Technical Problem

As described in claim 2 of PTL 1 that "The predictive abnormality diagnosis device according to claim 1, wherein when the learning period of the normal model includes the maintenance period, the learning means learns the normal model based on a fixed value corresponding to time-series data in at least the maintenance period on a device under maintenance among the plurality of devices and time-series data on a device that is kept in operation even during the maintenance period among the plurality of devices", when the learning period of predictive diagnosis includes the maintenance period, the detection value of a corresponding sensor is discarded due to maintenance work, and the fixed value is used instead.

In paragraph 0070 of PTL 1, a description is given that "Further, the data mining learning unit 161 uses, as learning target data corresponding to the device A (maintenance target), the fixed value α corresponding to a detection value in the normal state immediately before maintenance. This makes it difficult for the magnitudes of the detection values of the sensor A1 before and after maintenance to deviate from the fixed value α. That is, the normal model for the machinery 2 is less likely to fluctuate through before, during, and after maintenance, and thus the normal model can be continuously learned in a stable manner", indicating that the data mining learning unit uses, as learning target data corresponding to the maintenance period, the fixed value corresponding to the detection value in the normal state immediately before maintenance to stabilize the normal model through before, during, and after maintenance.

As described above, PTL 1 discloses the predictive abnormality diagnosis device capable of performing a predictive abnormality diagnosis all the time including the maintenance period, but has no description of construction of a diagnosis model using measurement data before and after maintenance. Any configuration that contributes to the solution of the following problem has not been disclosed accordingly.

(1) The measurement data before and after maintenance contains a number of pieces of data useful for predictive abnormality diagnosis. For example, with greasing up a bearing taken as an example, a low lubrication state brought about by grease deterioration is measured before greasing up. On the other hand, after greasing up, measurement data in a state where lubrication performance has been refreshed by greasing up can be obtained. A sign predictive of abnormality that is a deterioration of lubrication performance can be diagnosed by using a feature that results from converting the measurement data before and after greasing up, the feature representing a difference between before and after greasing up. A mechanism for searching for such a feature is required.

(2) There may be a plurality of features representing the difference between before and after maintenance, depending on a device configuration or installation environment. There are also a number of feature detection algorithms, and considerations must be given to detection sensitivity, processing load, and sensor cost for each algorithm accordingly. Furthermore, the feature serves as input data for performing diagnosis processing. There are also a number of predictive diagnosis algorithms, and optimal diagnosis processing can be performed by using a combination of a predictive diagnosis algorithm and a feature. A mechanism for searching for such an optimal feature detection algorithm and predictive diagnosis algorithm is required.

(3) When a device for use in predictive abnormality diagnosis is a dedicated device that represents a specific physical quantity or a dedicated device specialized for a specific device, there is little expectation for mass production effects, and the device becomes very expensive accordingly. Therefore, a mechanism that allows the optimal feature detection algorithm and predictive diagnosis algorithm searched for in the above (1) and (2) to be reconfigured on a general-purpose device is required.

An object of the present invention is to provide a failure diagnosis system capable of solving at least one of the above (1) to (3).

Solution to Problem

In order to solve the aforementioned problems, a failure diagnosis system according to the present invention is configured to diagnose a sign predictive of failure of diagnosis target equipment and includes a sensor configured to acquire measurement data from the diagnosis target equipment, a pre-maintenance data DB where the measurement data before maintenance acquired by the sensor is stored, a post-maintenance data DB where the measurement data after maintenance acquired by the sensor is stored, a feature detection algorithm group DB where a plurality of feature detection algorithms are stored, a first feature detection unit configured to detect a feature based on the measurement data by using each of the plurality of feature detection algorithms read from the feature detection algorithm group DB, an algorithm search unit configured to select one of the plurality of feature detection algorithms based on the feature detected by using each of the plurality of feature detection algorithms, a second feature detection unit configured to detect a feature from the measurement data by using the feature detection algorithm selected by the algorithm search unit, and a predictive diagnosis processing unit configured to diagnose a sign predictive of failure of the diagnosis target equipment by using the feature output from the second feature detection unit.

Advantageous Effects of Invention

According to the present invention, it is possible to easily identify, based on measurement data before and after maintenance, a type of feature and feature detection algorithm that allow a difference between before and after maintenance to be optimally expressed and select the optimal combination from among a plurality of combination candidates of features, feature detection algorithms, and diagnosis processing algorithms with consideration given to detection performance, hardware limits, cost, and the like.

DESCRIPTION OF EMBODIMENTS

Hereinafter, a description will be given of embodiments of the present invention with reference to the drawings.

First Embodiment

A failure diagnosis system 100 according to a first embodiment of the present invention will be described with reference to FIG. 1 to FIG. 9.

Figure 2:
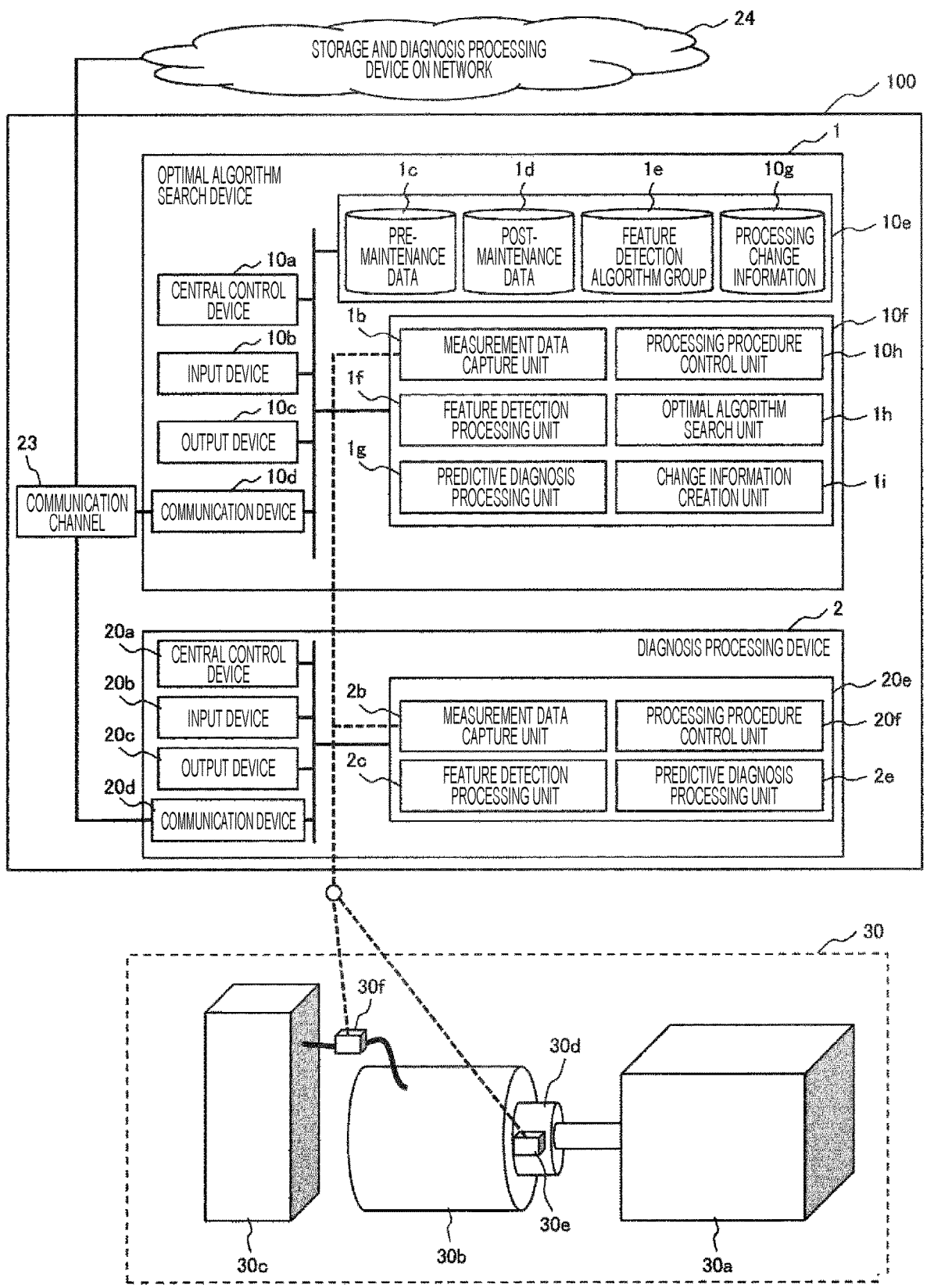
FIG. 2 is a hardware block diagram of the failure diagnosis system according to the first embodiment.

First, a description will be given of a structure of the failure diagnosis system 100 with reference to the hardware block diagram of FIG. 2. As illustrated in FIG. 2, the failure diagnosis system 100 includes an optimal algorithm search device 1 and a diagnosis processing device 2 that are connected to each other by a communication channel 23. The failure diagnosis system 100 is configured to diagnose, based on a feature acquired by a sensor 3 attached to an air compressor serving as a diagnosis target, a sign predictive of abnormality in the air compressor 30. Of the components of the failure diagnosis system 100, the optimal algorithm search device 1 is configured to search for the optimal feature detection algorithm for use in diagnosis of a sign predictive of abnormality in the air compressor 30, and the diagnosis processing device 2 is configured to diagnose a sign predictive of abnormality in the air compressor 30 by using a feature acquired based on the optimal feature detection algorithm.

Herein, a structure where the failure diagnosis system 100 includes the optimal algorithm search device 1 and the diagnosis processing device 2 that are separated from each other is illustrated, but the failure diagnosis system 100 may include the optimal algorithm search device 1 and the diagnosis processing device 2 that are integrated with each other. Further, the failure diagnosis system 100 may be connected to a storage and diagnosis processing device 24 on a network by the communication channel 23 to allow the storage and diagnosis processing device 24 to take charge of some of the function of the optimal algorithm search device 1. In the following, a description will be given of an example where the air compressor 30 serves as the diagnosis target, but it goes without saying that different equipment may serve as the diagnosis target.

The air compressor 30 serving as the diagnosis target according to the present embodiment includes an air compressor body 30a, a rotary machine 30b that drives the air compressor body 30a, and a power supply 30c of the rotary machine 30b. Further, an acceleration sensor 30e that measures vibrations is attached to a bearing 30d of the rotary machine 30b, and a current sensor 30f that measures a supplied current is attached to an electric wire connecting the power supply 30c and the rotary machine 30b. Hereinafter, sensors that acquire physical quantities of the air compressor 30 such as the acceleration sensor 30e and the current sensor 30f are referred to as the sensor 3 of the air compressor 30, and an effective acceleration value and current value acquired by the sensor 3 are each referred to as a feature of the air compressor 30.

As illustrated in FIG. 2, the optimal algorithm search device 1 includes a central control device 10a such as a CPU, an input device 10b such as a keyboard or a mouse, an output device 10c such as a display, a communication device 10d connected to the communication channel 23, a secondary storage device 10e such as an HDD or SSD, and a primary storage device 10f such as a semiconductor memory, and these components are connected to each other by a bus. With programs corresponding to a feature detection processing unit 1f and the like (to be described later) loaded in the primary storage device 10f, the central control device 10a executes the programs to implement each function illustrated within the primary storage device 10f in FIG. 2. Further, the secondary storage device 10e holds a feature detection algorithm group 1e and the like (to be described later), and the central control device 10a reads from or writes to the feature detection algorithm group 1e and the like as needed to implement a desired function. Note that a processing procedure control unit 10h controls a processing procedure of the central control device 10a.

Further, the diagnosis processing device 2 includes a central control device 20a such as a CPU, an input device 20b such as a keyboard or a mouse, an output device 20c such as a display, a communication device 20d connected to the communication channel 23, and a primary storage device 20e such as a semiconductor memory, and these components are connected to each other by a bus. With programs corresponding to a feature detection processing unit 2c and the like (to be described later) loaded in the primary storage device 20e, the central control device 20a executes the programs to implement each function illustrated within the primary storage device 20e in FIG. 2. Note that a processing procedure control unit 20f controls a processing procedure of the central control device 20a.

Next, a description will be given of a reason why the diagnosis processing device 2 can diagnose an abnormality based on the effective acceleration value acquired by the acceleration sensor 30e on the bearing 30d with reference to FIG. 9. In the graph shown in FIG. 9, a vertical axis represents the effective acceleration value, and a horizontal axis represents a cumulative operation time. A solid line in the graph represents a change with time in the effective acceleration value of the bearing 30d when typical grease deterioration occurs in the rotary machine 30b that rotates at a constant speed and further represents a situation where grease is applied to the bearing 30d at time T1 and time T2 when the effective acceleration value reaches a predetermined threshold a0, thereby causing the effective acceleration value to decrease.

On the other hand, a dashed line L1 represents a change with time in the effective acceleration value after time T2 when no greasing up is performed at time T2. After the elapse of a sufficient time from greasing up at time T1, when an increase in the effective acceleration value exceeding the threshold a0 has been observed, the increase in the effective acceleration value can be diagnosed as resulting from grease deterioration, allowing the diagnosis processing device 2 to notify an administrator of the air compressor 30 or the like of a warning prompting the administrator or the like to perform greasing up.

On the other hand, a dashed line L2 represents a situation where the effective acceleration value has reached the predetermined threshold a0 before the elapse of the sufficient time from the greasing up at time T1. When such an increase in the effective acceleration value has been observed, the increase in the effective acceleration value can be diagnosed, by the diagnosis processing device 2, as resulting from a factor other than normal grease deterioration, allowing the diagnosis processing device 2 to notify the administrator of the air compressor 30 or the like of an abnormality in the bearing 30d such as breakage or contamination by foreign bodies.

Figure 9:
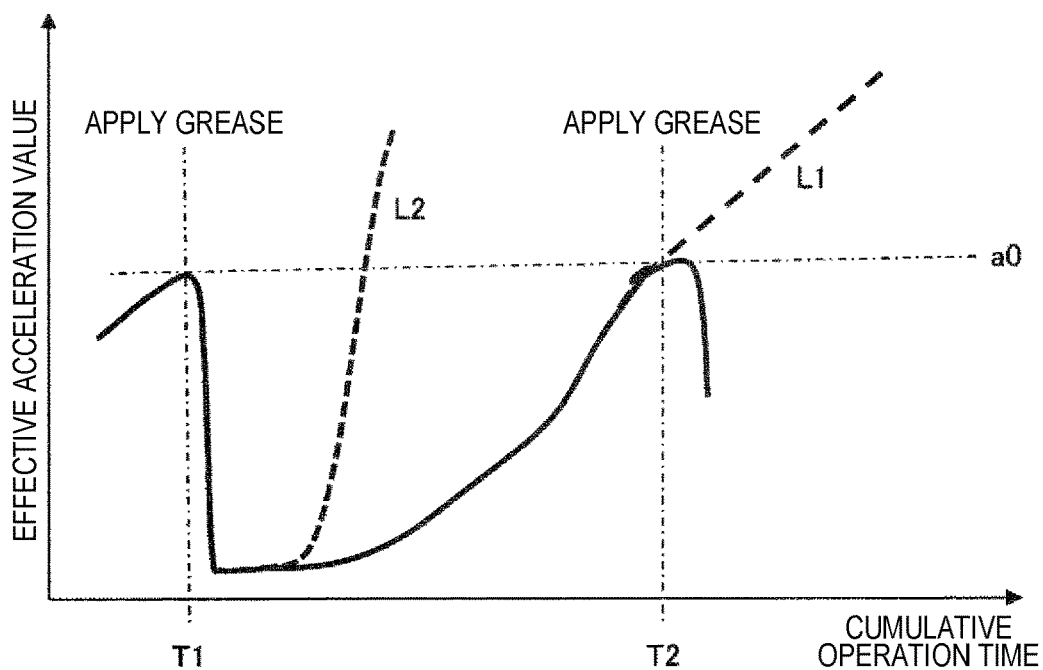
FIG. 9 is a graph showing a change with time in effective acceleration value acquired by an acceleration sensor on a bearing.

In FIG. 9 thus described, a large change with time in the effective acceleration value has been observed, allowing the diagnosis processing device 2 to diagnose a sign predictive of abnormality with high accuracy. However, when the feature detection algorithm used by the diagnosis processing device 2 is not appropriate, the change with time in the effective acceleration value may be observed as being small in degree, preventing the predictive abnormality diagnosis from being properly made, which reveals that selection of an appropriate feature detection algorithm greatly affects the accuracy of the predictive abnormality diagnosis.

Next, a detailed description will be given of each function implemented by the optimal algorithm search device 1 and the diagnosis processing device 2 with reference to the functional block diagram of FIG. 1.

<Optimal Algorithm Search Device>

A maintenance progress state setting unit 1a of the optimal algorithm search device 1 is a component configured to manually or automatically set and record a progress state of maintenance of the air compressor 30. Specifically, the maintenance progress state setting unit 1a sets and records a state before and after maintenance and event information (a time when grease is applied) during maintenance.

A measurement data capture unit 1b is a component configured to convert a physical quantity (charge, current, resistance, or the like) acquired by the sensor 3 into a voltage analog signal or a voltage digital signal value. Of pieces of data captured by the measurement data capture unit 1b, data captured before maintenance is stored in a pre-maintenance data DB 1c (DB stands for database, and the same applies to the following), and data captured after maintenance is stored in a post-maintenance data DB 1d. A description will be given herein of a configuration where the pre-maintenance data DB 1c and the post-maintenance data DB 1d are separated from each other, but another configuration may be employed where the data captured before maintenance and the data captured after maintenance are stored in the same database and separately read based on time information or event information stored together with each piece of the data.

The feature detection processing unit 1f performs feature detection computation on data read from the pre-maintenance data DB 1c and data read from the post-maintenance data DB 1d by using a plurality of feature detection algorithms prestored in the feature detection algorithm group DB 1e and outputs a plurality of feature detection results.

An optimal algorithm search unit 1g compares the plurality of feature detection results thus input, and selects a feature detection algorithm corresponding to the best feature detection result. Herein, such selection of the feature detection algorithm may be automatically made by the optimal algorithm search unit 1g based on mathematical index information, or manually made by the administrator or the like based on visualized information such as a waveform.

Further, another configuration may be employed where a plurality of candidates that results from narrowing down the feature detection algorithms to some extent based on the mathematical index information are presented, and the final selection is manually made by the administrator or the like.

Herein, the final goal of the failure diagnosis system 100 according to the present embodiment is to increase performance of the predictive abnormality diagnosis of the air compressor 30 made by the diagnosis processing device 2. The performance of the diagnosis processing device 2 is determined by a combination of a predictive diagnosis algorithm and a feature detection algorithm, and it is therefore desirable that the optimal algorithm search unit 1g evaluate the feature detection algorithm with consideration given to a combination of the feature detection algorithm and a predictive diagnosis algorithm actually used by the diagnosis processing device 2. In order to make the above configuration feasible, as illustrated in FIG. 1, a result of predictive diagnosis processing in the diagnosis processing device 2 is input to the optimal algorithm search unit 1g through the communication channel 23, and a feature detection algorithm suitable for a predictive diagnosis algorithm applied to the diagnosis processing device 2 may be selected based on the result of predictive diagnosis processing. Note that, in FIG. 1, the result of predictive diagnosis processing is acquired from a predictive diagnosis processing unit 2c of the diagnosis processing device 2, but a predictive diagnosis algorithm equivalent to the predictive diagnosis algorithm applied to the predictive diagnosis processing unit 2c is prestored in a predictive diagnosis processing unit 2e' in the optimal algorithm search device 1, and a feature detection algorithm suitable for the predictive diagnosis algorithm may be selected based on an output from the predictive diagnosis processing unit 2e'. This configuration allows the optimal algorithm search device 1 alone to select the optimal feature detection algorithm even when the diagnosis processing device 2 is out of operation.

An algorithm change information generation unit 1h generates algorithm change information used to apply the feature detection algorithm selected by the optimal algorithm search unit 1g to a feature detection unit 2a of the diagnosis processing device 2. Details of the algorithm change information will be described later.

<Diagnosis Processing Device>

Next, a description will be given of the diagnosis processing device 2. The diagnosis processing device 2 includes the feature detection unit 2a, the predictive diagnosis processing unit 2e, and a diagnosis result output unit 2f. A feature detected by the feature detection unit 2a is input to the predictive diagnosis processing unit 2e to cause the predictive diagnosis processing unit 2e to perform the predictive diagnosis processing. Herein, to the predictive diagnosis processing, various predictive diagnosis algorithms such as threshold processing, trend analysis, statistical analysis, a method using AI, and machine learning are applicable. A diagnosis result obtained by the predictive diagnosis processing unit 2e is output from the diagnosis result output unit 2e.

Figure 4:
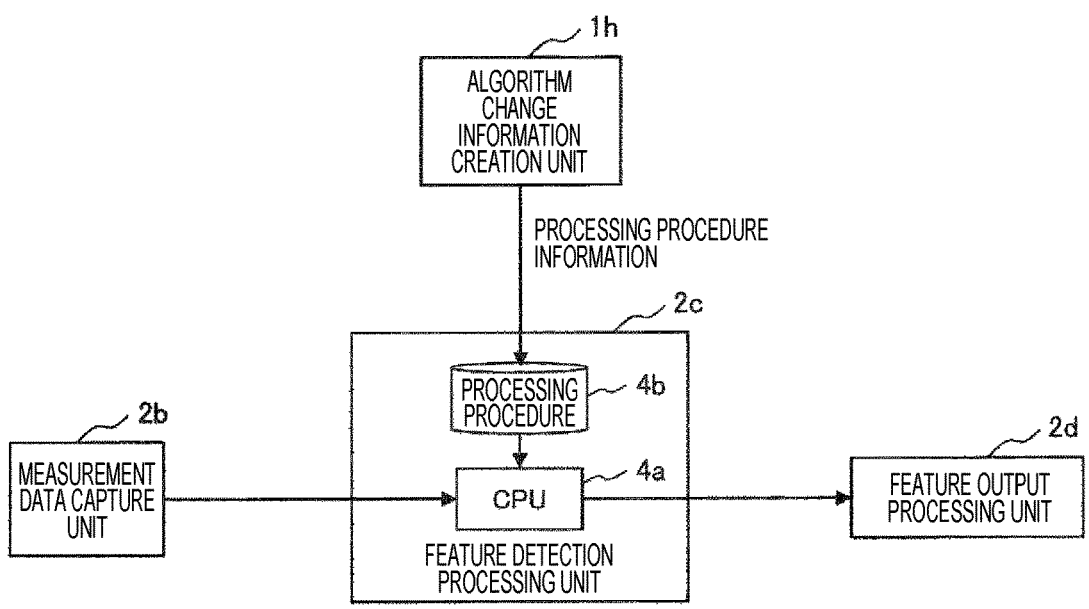
FIG. 4 illustrates a second structure example of the feature detection processing unit of the diagnosis processing device.
Figure 5:
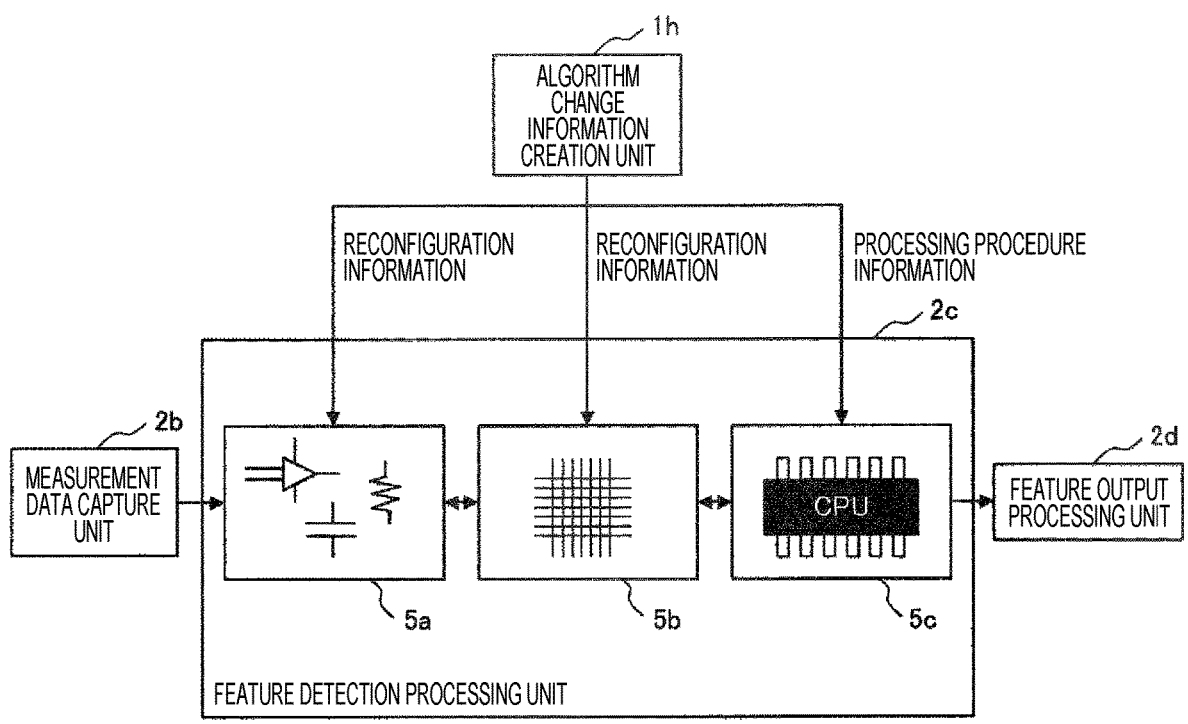
FIG. 5 illustrates a third structure example of the feature detection processing unit of the diagnosis processing device.

The feature detection unit 2a includes a measurement data capture unit 2b, the feature detection unit 2c, and a feature output processing unit 2d. Of these components, the feature detection unit 2c rewires a processing circuit in accordance with the algorithm change information generated by the algorithm change information generation unit 1h to enable feature detection with the optimal feature detection algorithm selected by the optimal algorithm search unit 1g. Specific examples of the feature detection processing unit 2c adapted to the change of the feature detection algorithm are illustrated in FIG. 3, FIG. 4, and FIG. 5.

<First Structure Example of Feature Detection Processing Unit>

Figure 3:
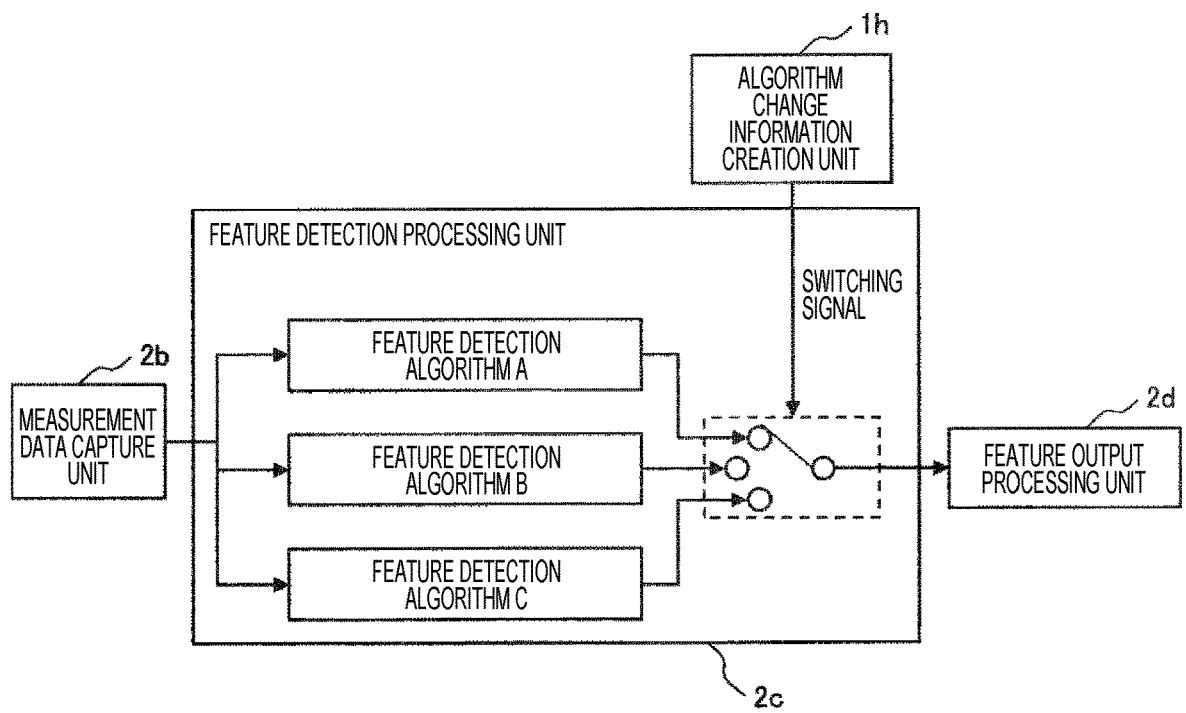
FIG. 3 illustrates a first structure example of a feature detection processing unit of a diagnosis processing device.

FIG. 3 illustrates a structure where a plurality of feature detection algorithms are prestored in the feature detection processing unit 2c, and switching to a feature detection algorithm to be used is made in accordance with a switching signal that is one aspect of the algorithm change information to reproduce the feature detection algorithm selected by the optimal algorithm search unit 1g. In this structure, the algorithm change information generation unit 1h outputs, to the feature detection processing unit 2c, the switching signal for selecting the feature detection algorithm selected by the optimal algorithm search unit 1g. Then, the feature detection processing unit 2c makes switching to the feature detection algorithm in accordance with the switching signal and detects the feature by using the feature detection algorithm thus designated.

<Second Structure Example of Feature Detection Processing Unit>

FIG. 4 illustrates a structure where the feature detection processing unit 2c is configured by a CPU 4a and a processing procedure DB 4b, and the feature detection processing unit 2c loads a necessary processing program from the processing procedure DB 4b in accordance with processing procedure information that is one aspect of the algorithm change information to reproduce the feature detection algorithm selected by the optimal algorithm search unit 1g. In this structure, the algorithm change information generation unit 1h outputs, to the feature detection processing unit 2c, the processing procedure information containing a list of processing programs necessary to implement the feature detection algorithm selected by the optimal algorithm search unit 1g. Then, the feature detection processing unit 2c causes the CPU 4a to execute the processing program designated by the processing procedure information to detect a feature by using the feature detection algorithm thus designated.

<Third Structure Example of Feature Detection Processing Unit>

FIG. 5 illustrates a structure where the feature detection processing unit 2c is configured by an LSI capable of reconfiguring processing such as a programmable system-on-chip, and the LSI is reconfigured in accordance with reconfiguration information or processing procedure information that is one aspect of the algorithm change information to reproduce the feature detection algorithm selected by the optimal algorithm search unit 1g. Note that when the structure illustrated in FIG. 5 is employed, the feature detection unit 2a may be configured by one LSI chip or may be configured by a combination of a plurality of chips.

As illustrated in FIG. 5, the feature detection processing unit 2c that is a programmable system-on-chip includes an analog circuit block 5a, a digital circuit (logic circuit) block 50b, and a CPU 50c. Note that these components are connected to each other so as to allow input pieces of measurement data to be processed in any order.

The analog circuit block 5a includes a number of operational amplifiers, resistors, capacitors, in which a switch circuit switches among circuit connections to allow the elements to be reconfigured into analog circuits having various functions Accordingly, it is possible to implement filter processing, processing of an analog signal such as an average value or an effective value in an analog domain by changing the circuit connections.

The digital circuit block 5b includes a number of gate circuits and functional digital circuits, in which various digital circuits can be created through a change of circuit connection configuration. Further, this processing may be performed with a field-programmable gate array (FPGA) or the like installed outside of the feature detection processing unit 2c.

The CPU 5c is capable of performing not only such processing as performed by the CPU 4a described with reference to FIG. 4, but also input and output with respect to the analog circuit block 5a and the digital circuit block 5b and dynamic control of each block. That is, the configuration where the algorithm change information generation unit 1h generates the reconfiguration information on the analog circuit block 5a, the reconfiguration information on the digital circuit block 5b, and the processing procedure information on the CPU 5c allows the optimal feature to be output based on the measurement data.

In the structure illustrated in FIG. 5, the algorithm change information generation unit 1h outputs, to the feature detection processing unit 2c, the reconfiguration information representing a digital circuit configuration or analog circuit configuration necessary to implement the feature detection algorithm selected by the optimal algorithm search unit 1g, or the processing procedure information containing the list of necessary programs. Then, the feature detection processing unit 2c is reconfigured in accordance with the reconfiguration information or processing procedure information and detects a feature by using the feature detection algorithm thus designated.

<Algorithm Selection Processing in Optimal Algorithm Search Device>

Figure 6:
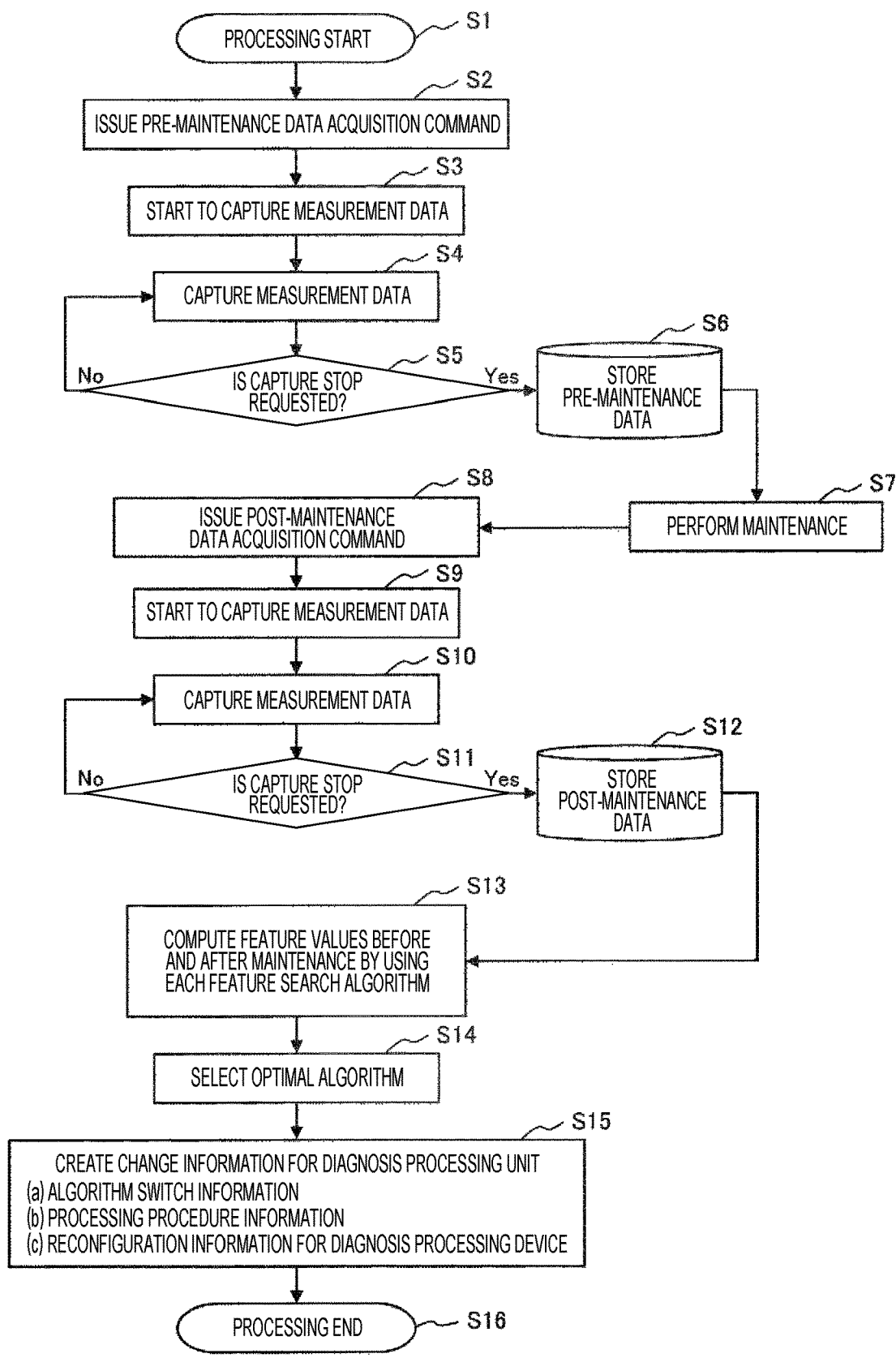
FIG. 6 is a flowchart of processing to be performed by an optimal algorithm search device.
Figure 7:
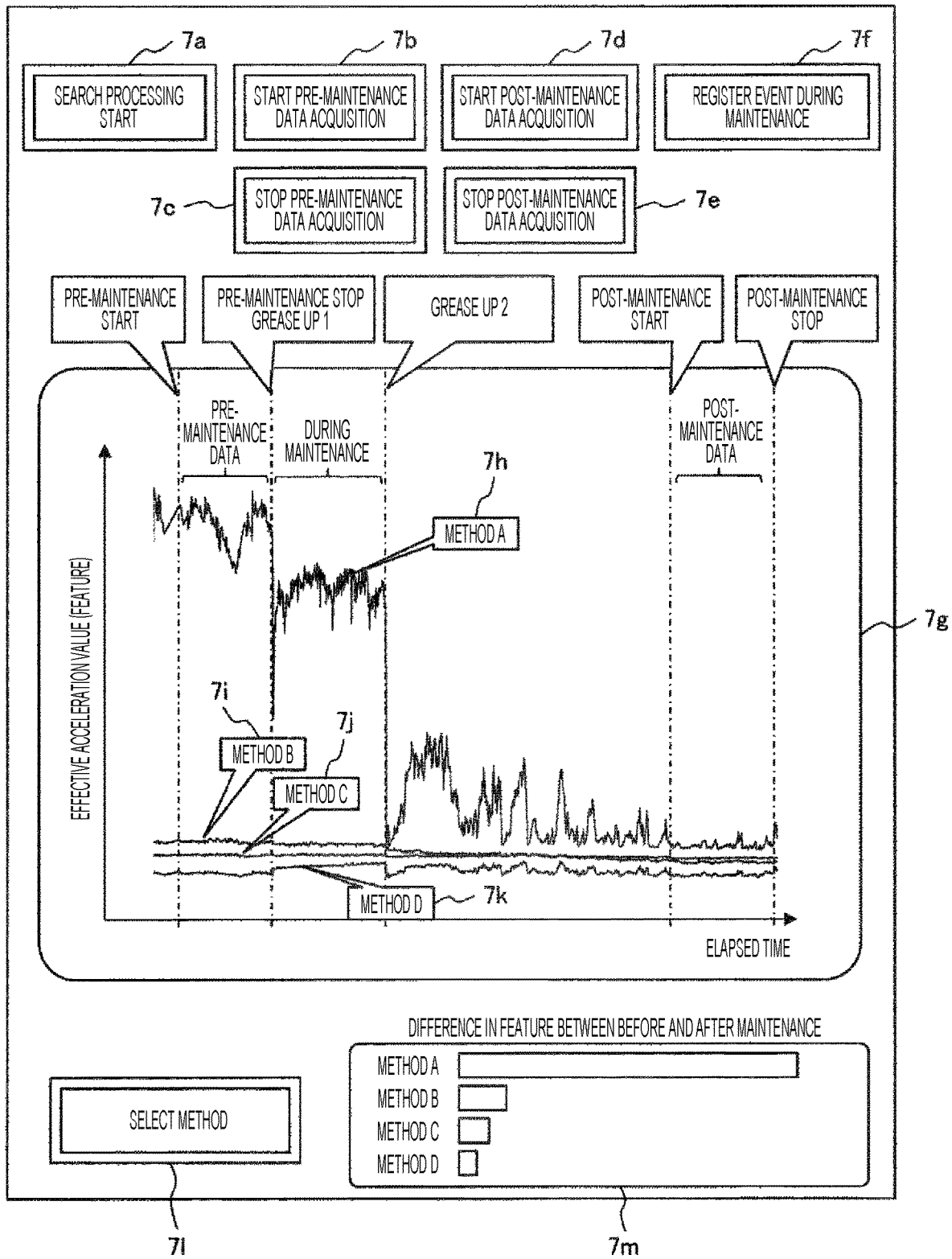
FIG. 7 illustrates an example of an operation screen of the optimal algorithm search device.

Next, a detailed description will be given of feature detection algorithm selection processing performed by the optimal algorithm search device 1 with reference to FIG. 6 and FIG. 7. FIG. 6 is a flowchart of algorithm selection processing performed by the optimal algorithm search device 1, and FIG. 7 is an example of an operation screen displayed on the output device 10c of the optimal algorithm search device 1. Note that the following description corresponds to a situation where the optimal feature detection algorithm is searched for based on measurement data before and after maintenance by which the bearing 30d of the air compressor 30 is greased up.

When a search processing start button 7a on the operation screen illustrated in FIG. 7 is pressed, search processing for the optimal feature detection algorithm is started (S1 in FIG. 6).

Next, when a pre-maintenance data acquisition start button 7b used to start the acquisition of sensor data before maintenance is pressed on the operation screen, a pre-maintenance data acquisition command is issued (S2) to start the capture of measurement data (S3), and sensor data is captured accordingly (S4). Subsequently, when a pre-maintenance data acquisition stop button 7c is pressed, a capture stop command is issued (S5), and the measurement data thus captured is stored in the pre-maintenance data DB 1c accordingly (S6). Consequently, the measurement data before the start of maintenance has been acquired.

In order to select the optimal feature detection algorithm, the measurement data before the start of maintenance needs to be captured for at least a certain time, and it is therefore desirable that the pre-maintenance data acquisition stop button 7c be pressed after the elapse of at least the certain time. For this reason, an elapsed time from the start of measurement data acquisition may be displayed on the operation screen, or the pre-maintenance data acquisition stop button 7c may be displayed after the elapse of a predetermined time. Alternatively, the optimal algorithm search device 1 may be kept in operation, and measurement data may be recorded all the time until the pre-maintenance data acquisition stop button 7c is pressed.

Subsequently, maintenance of the bearing 30d is performed (S7). Note that, during this maintenance, it is assumed that, after the first greasing up, the air compressor 30 is kept in operation for a predetermined time, and then the second greasing up is performed.

An event-during-maintenance registration button 7d displayed on the operation screen is a button used to register an event during maintenance. For example, as described above, when the greasing up is performed twice, pressing the button for each greasing up makes it possible to record the occurrence of the event. This in turn makes it possible to visualize how a feature changes depending on the event (how much the feature is affected by the event). Note that another configuration may be employed where an RFID or the like is attached to a grease inlet, and a grease application jig is brought into close proximity to the grease inlet to cause a corresponding event to be automatically registered.

When the maintenance is completed, and then a post-maintenance data acquisition start button 7d is pressed to start acquisition of measurement data after the maintenance, a post-maintenance data acquisition command is issued (S8) to start the capture of measurement data (S9), and measurement data is captured accordingly (S10). Subsequently, when a post-maintenance data acquisition stop button 7e is pressed, the capture stop command is issued (S11), and the measurement data thus captured is stored in the post-maintenance data DB 1d accordingly (S12). Consequently, the measurement data before the start of maintenance has been acquired.

When the measurement data before the maintenance and the measurement data after the maintenance have been acquired, the feature detection processing unit 1f manipulates the pieces of measurement data read from the pre-maintenance data DB 1c and post-maintenance data DB 1d by using each of the feature detection algorithms stored in the feature detection algorithm group DB 1e to compute a feature value based on the feature detection algorithm (S13).

A description will be given below of, with reference to a waveform display field 7g illustrated in FIG. 7, a method for selecting the optimal feature detection algorithm from four feature detection algorithms (method A to method D) stored in the feature detection algorithm group DB 1e. Note that it is assumed that measurement data is acquired even during maintenance, and a feature is also computed from such measurement data.

As is apparent from the waveform display field 7g, a difference in effective acceleration value (7h) obtained by the method A between before and after maintenance is significantly larger than differences in effective acceleration values (7i to 7k) obtained by the other methods. A difference in feature between before and after maintenance display field 7m displays differences in effective acceleration values (features) before and after maintenance with a bar graph, making it possible to grasp the advantage of the method A more easily.

Based on these pieces of information, a feature detection algorithm that maximizes the difference in feature between before and after maintenance is selected as the optimal algorithm (S14). As described above, an algorithm may be selected automatically by the optimal algorithm search unit 1g, or may be manually selected by the administrator or the like through operation of a method selection button 7l.

Then, the change information creation unit 1h creates the algorithm change information to be transmitted to the diagnosis processing device 2 based on the feature detection algorithm thus selected (S15), and transmits the algorithm change information to the diagnosis processing device 2 to bring a series of feature detection algorithm selection processing to an end. Note that the algorithm change information thus created corresponds to the information described with reference to FIG. 3, FIG. 4, and FIG. 5.

As described above, the optimal feature detection algorithm is searched for, and the change information for the diagnosis processing device 2 is generated.

<Predictive Abnormality Diagnosis Processing in Diagnosis Processing Device>

Figure 8:
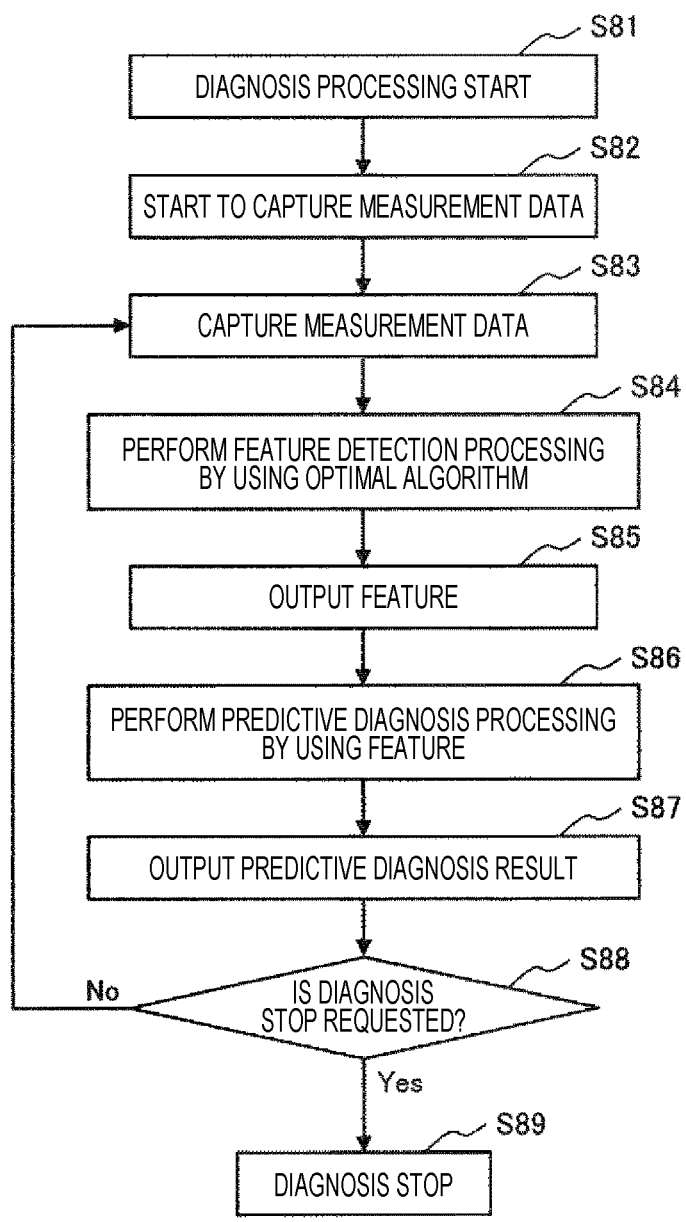
FIG. 8 is a flowchart of processing to be performed by the diagnosis processing device.

Next, a description will be given of a flow of predictive abnormality diagnosis processing in the diagnosis processing device 2 with reference to FIG. 8. Note that, in the following description, it is assumed that the feature detection algorithm applied to the feature detection processing unit 2c of the diagnosis processing device 2 has been switched to the feature detection algorithm selected by the optimal algorithm search device 1.

When the predictive abnormality diagnosis processing is started (S81), the feature detection unit 2a of the diagnosis processing device 2 starts to capture measurement data input from the sensor 3 while the air compressor 30 is in actual operation (S82). Then, when the measurement data capture unit 2b has captured the measurement data (S83), the feature detection processing unit 2c detects a feature (for example, effective acceleration value) from the measurement data by using the optimal feature detection algorithm selected by the optimal algorithm search device 1 (S84), and then the feature output processing unit 2d outputs the feature (S85). This makes it possible to acquire a feature while the air compressor 30 is in actual operation by using an algorithm most suitable for highlighting the difference in feature between before and after maintenance.

Subsequently, the predictive diagnosis processing unit 2e performs the predictive diagnosis processing by using the feature output from the feature detection unit 2a (S86). Since the feature used herein is obtained based on the algorithm that highlights a change in state of the air compressor 30, the use of the feature as an input to the predictive diagnosis algorithm makes it possible to increase the accuracy of predictive abnormality diagnosis. A result of predictive diagnosis is output from the diagnosis result output unit 2f (S87), and diagnosis processing in steps S83 to S87 is repeated until a diagnosis stop command is received (S88). Then, when the diagnosis stop command is received, the predictive abnormality diagnosis in the diagnosis processing device 2 is stopped (S89).

<Effect of Present Embodiment>

The structure and configuration of the present embodiment described above make it possible to easily identify, based on measurement data before and after maintenance, a type of feature and feature detection algorithm that allow a difference between before and after maintenance to be optimally expressed, to increase the accuracy of predictive abnormality diagnosis in the diagnosis processing device 2 by using the feature detection algorithm, and to select the optimal combination from among a plurality of combination candidates of features, feature detection algorithms, and diagnosis processing algorithms with consideration given to detection performance, hardware limits, cost, and the like.

Further, even when there are various device configurations and features peculiar to a current environment, it is possible for a single device to perform diagnosis processing through flexible reconfiguration.

Note that the present invention is not limited to the application to the bearing diagnosis described above as an example. For example, the present invention is additionally applicable to various physical quantities and diagnosis items such as motor coil insulation diagnosis and filter clogging diagnosis, which makes it possible to reduce the cost by mass production.

Second Embodiment

Next, a description will be given of a failure diagnosis system according to a second embodiment of the present invention with reference to FIG. 10 to FIG. 13B.

Note that description will be omitted for common parts with the first embodiment.

In FIG. 7 of the first embodiment, the feature detection algorithm (method A) that maximizes the difference in the effective acceleration value before and after maintenance is selected as the optimal algorithm, but, according to the present embodiment, the optimal algorithm is selected from a different viewpoint.

<First Modification of Optimal Algorithm Selection Method>

Figure 10:
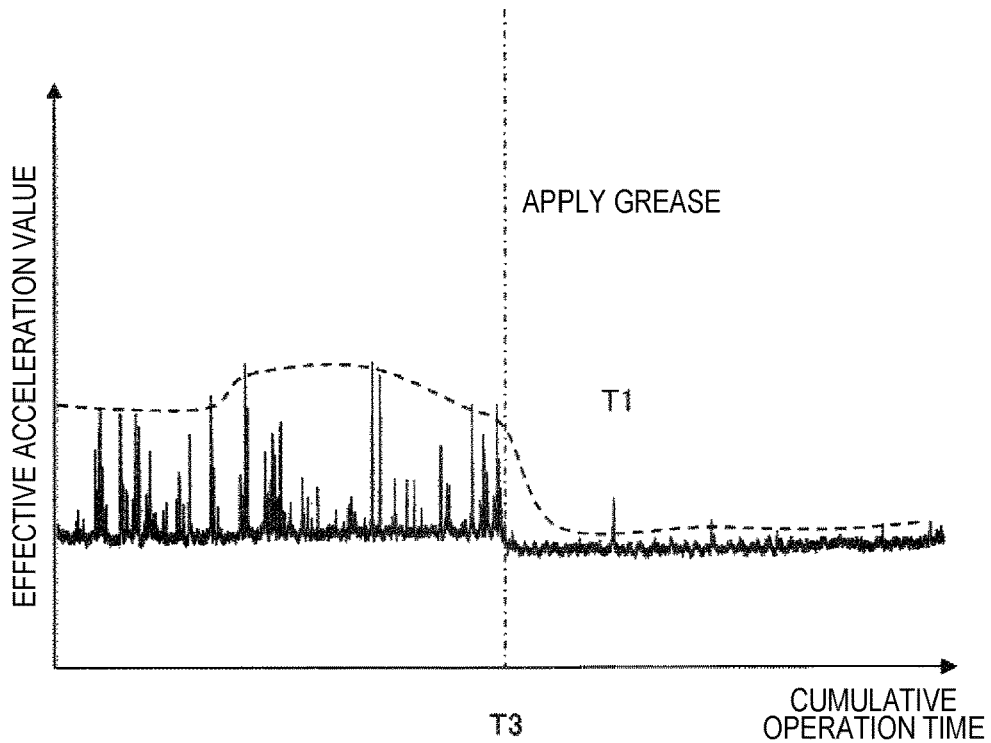
FIG. 10 is a graph showing a change with time in effective acceleration value acquired by an acceleration sensor according to a second embodiment.

When an effective acceleration value (feature) as shown in FIG. 10 is observed when the rotary machine 30b is rotated at a constant speed, the change in feature before and after application of grease is significantly small as compared with the example shown in FIG. 7, which prevents the optimal feature detection algorithm from being selected by the method shown in FIG. 7.

Therefore, in FIG. 10, attention is paid to the fact that a frequency and degree of hair-like increases in feature between before and after application of grease. In this case, the maximum effective value in a certain time window is obtained, and a time position is gradually shifted within the window, thereby making it possible to obtain a curve represented by a dashed line L3. A feature detection algorithm that maximizes a difference in dashed line L3 before and after application of grease may be selected as the optimal algorithm accordingly.

<Second Modification of Optimal Algorithm Selection Method>

Figure 11A:
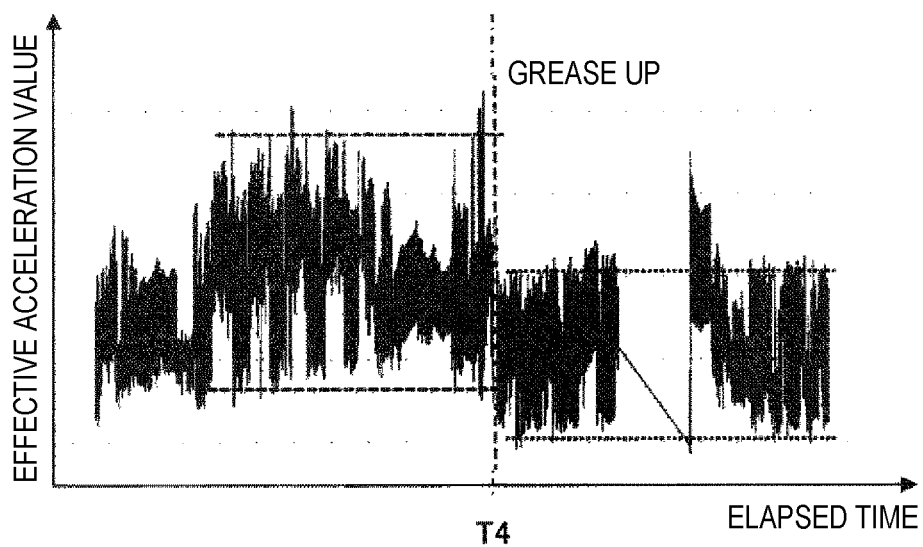
FIG. 11A is a graph showing a change with time in effective acceleration value acquired by the acceleration sensor according to the second embodiment.

When the rotary machine 30b is a speed-variable machine that changes the rotation speed in response to changes in load, an effective acceleration value (feature) as shown in FIG. 11A is observed, but the effective acceleration value significantly changes depending on the rotation speed, which prevents the optimal feature detection algorithm from being selected by the method shown in FIG. 7 that focuses on the change in feature before and after application of grease or the method shown in FIG. 10 that focuses on the frequency and degree of the hair-like increases in feature before and after application of grease.

Figure 11B:
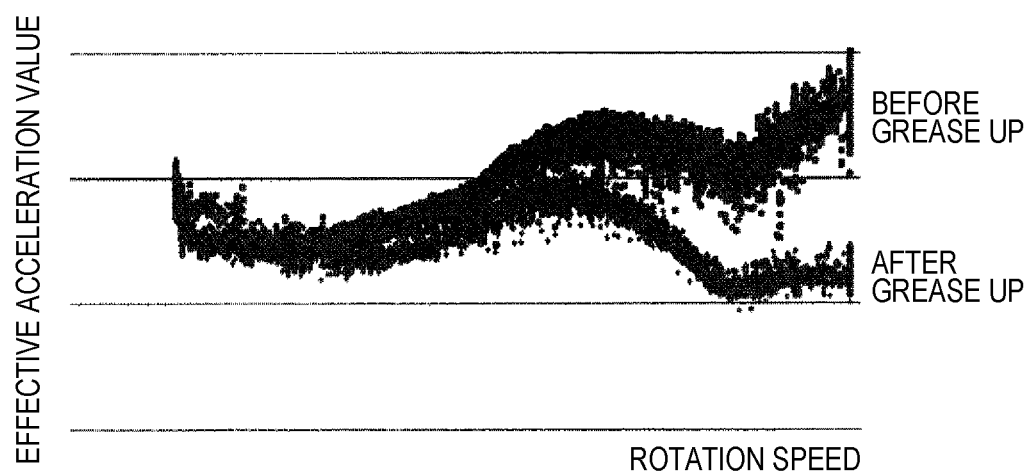
FIG. 11B is a graph showing a relation between the effective acceleration value acquired by the acceleration sensor according to the second embodiment and a rotation speed.
Figure 12:
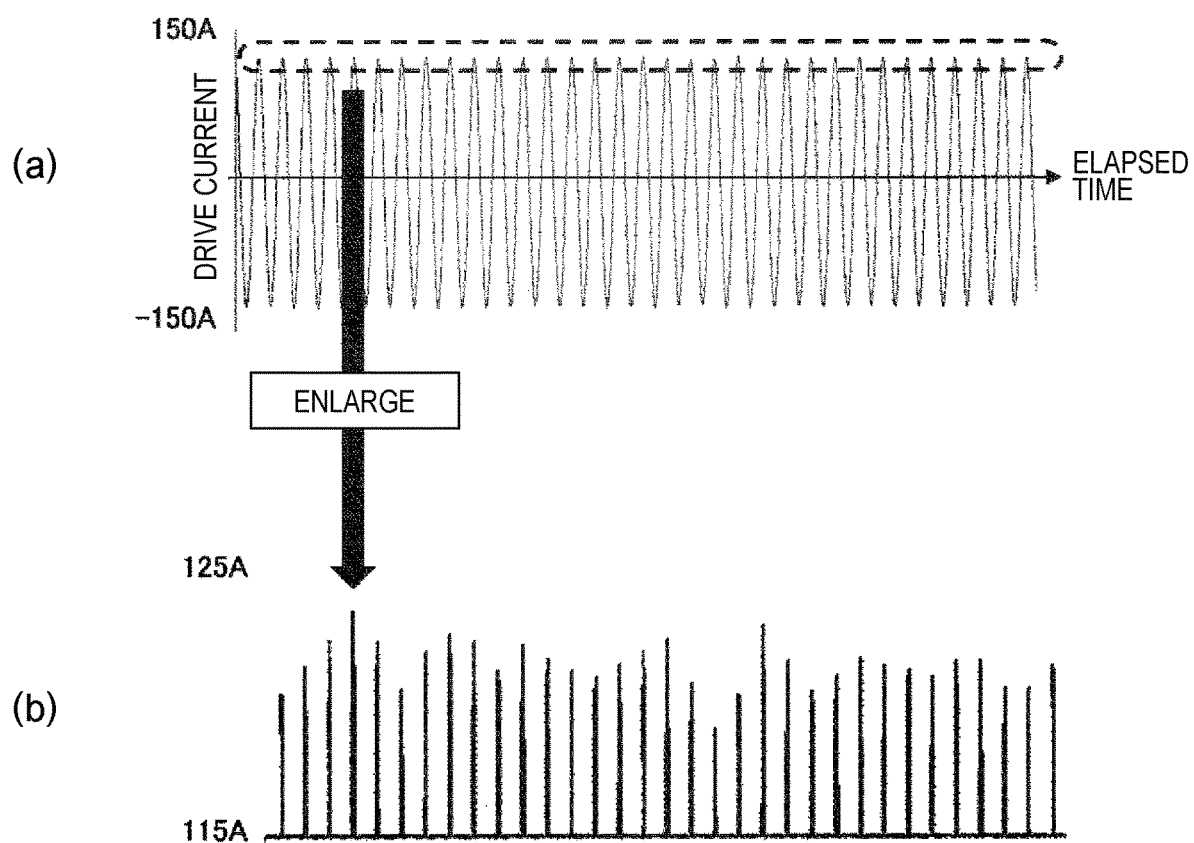
FIG. 12 is a graph showing a change with time in current value acquired by a current sensor according to the second embodiment.

Therefore, as shown in FIG. 11B, the effective acceleration value is shown on the vertical axis and the rotational speed is shown on the horizontal axis, which reveals that a large difference in distribution can be observed before and after application of grease. A feature detection algorithm that maximizes the difference in distribution before and after application of grease may be selected as the optimal algorithm accordingly.

<Third Modification of Optimal Algorithm Selection Method>

The feature detection algorithm selection methods where the effective acceleration value serves as the feature have been described above. Next, a description will be given, with reference to FIG. 12 to FIG. 13B, of a feature detection algorithm selection method where a waveform of a drive current applied to the rotary machine 30b based on the output from the current sensor 30f serves as the feature.

In FIG. 12(a), the vertical axis represents the drive current, and the horizontal axis represents the elapsed time. When an alternating current is supplied as the drive current applied to the rotary machine 30b, enlarged peak values of the drive current show that a current value corresponding to a drive current peak value portion fluctuates like a wave as shown in FIG. 12(b). This is because a slip amount proportional to the load is amplitude-modulated into an alternating current wave.

Figure 13A:
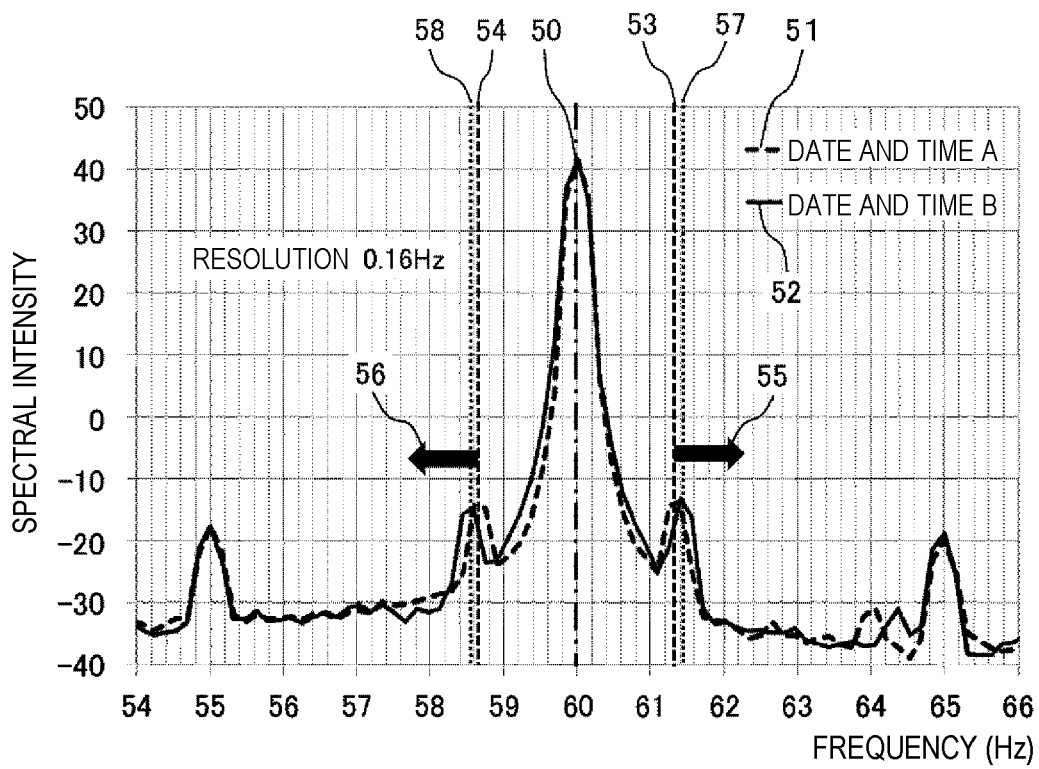
FIG. 13A is a graph showing a spectral intensity of the current value acquired by the current sensor according to the second embodiment.

Therefore, when FIG. 12(b) is converted into frequency components in a waveform, the slip shown in FIG. 12(b) appears as sidebands (53, 54, and the like) as shown in FIG. 13A where the vertical axis represents the spectral intensity, and the horizontal axis represents the frequency. Further, the slip magnitude appears as a distance from a power supply frequency 50 (for example, a distance from 50 to 54). That is, as the slip increases in magnitude, positions of the sidebands move outward as indicated by arrows 55 and 56.

Figure 13B:
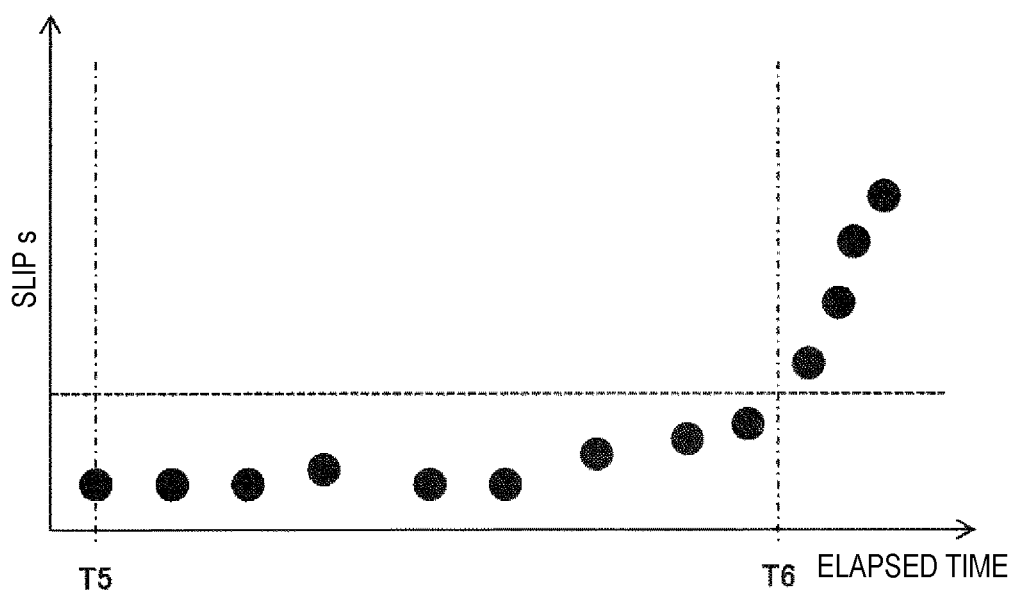
FIG. 13B is a graph showing a change with time in slip of the current value acquired by the current sensor according to the second embodiment.

FIG. 13B is a graph with the vertical axis representing the slip and the horizontal axis representing the elapsed time, showing a relation between the elapsed time from greasing up time T5 and the slip amount. This graph shows that, at time T6, the load on the rotary machine 30b increases abruptly due to grease deterioration, and the slip amount also increases abruptly. Therefore, a feature detection algorithm that maximizes a difference in slip amount before and after application of grease may be selected as the optimal algorithm.

Third Embodiment

Figure 14A:
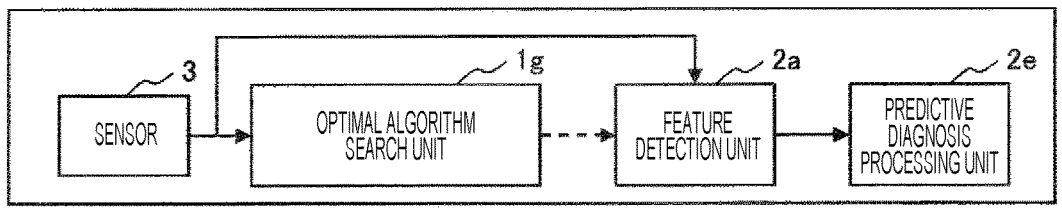
FIG. 14A is a connection diagram of first main components of a failure diagnosis system according to a third embodiment.

Next, a description will be given of a failure diagnosis system according to the second embodiment of the present invention with reference to FIG. 14A to FIG. 14C. Note that description will be omitted for common parts with the first embodiment.

Figure 1:
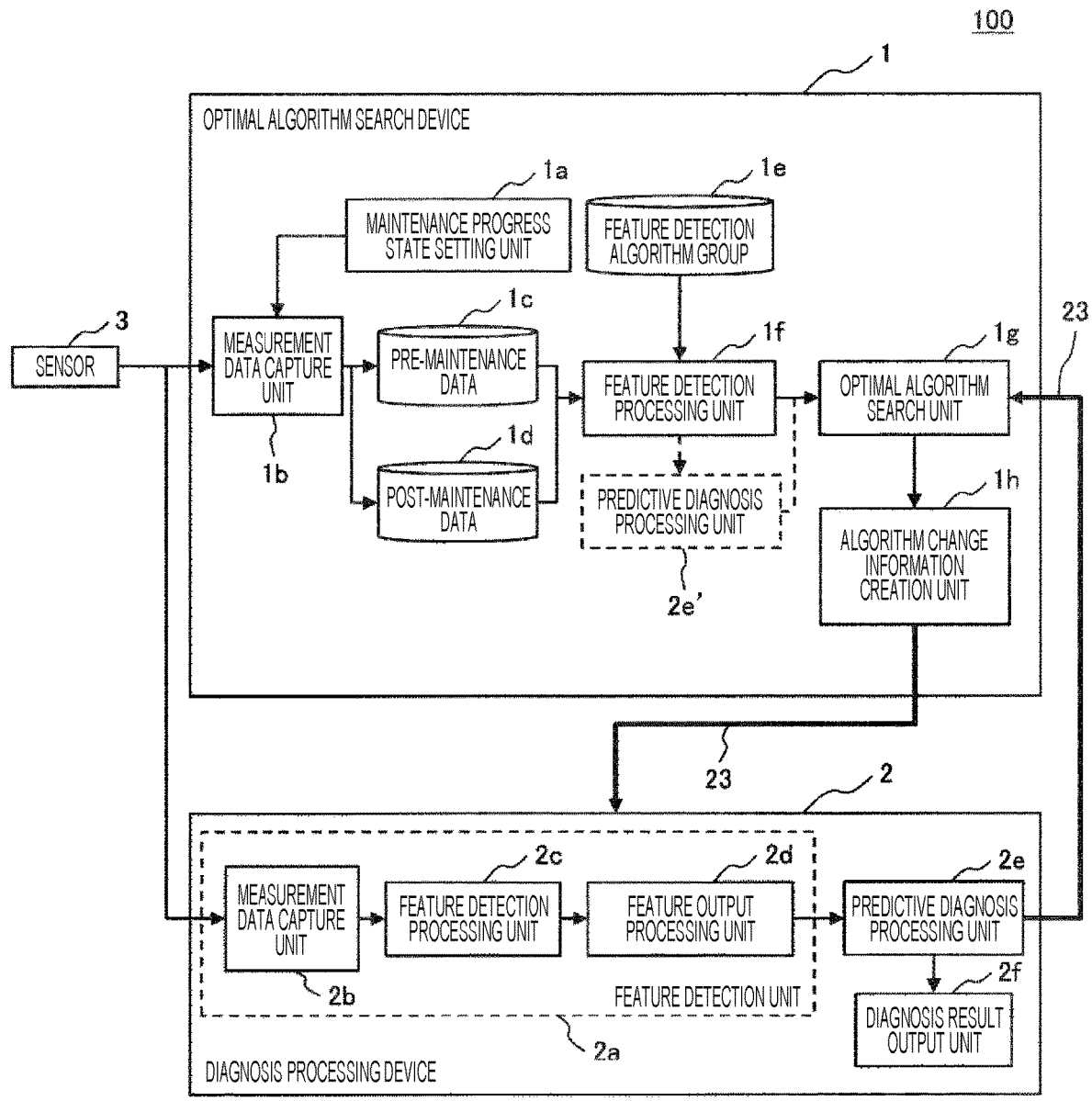
FIG. 1 is a functional block diagram of a failure diagnosis system according to a first embodiment.

The failure diagnosis system 100 according to the first embodiment has a structure where the optimal algorithm search device 1 and a feature extraction device 2 are separated from each other as shown in FIG. 1, FIG. 2, and the like, but the optimal algorithm search device 1 and the feature extraction device 2 may be integrated with each other. In this case, as shown in the connection diagram of main components of FIG. 14A, with the optimal algorithm search unit 1g, the feature detection unit 2a, and the predictive diagnosis processing unit 2e provided in a single device, the optimal algorithm search unit 1g may manipulate, at the time of the optimal algorithm selection processing, the measurement data to select the optimal algorithm, and the feature detection unit 2a and the predictive diagnosis processing unit 2e may manipulate, at the time of the normal diagnosis processing, the measurement data to diagnose a sign predictive of abnormality.

Figure 14B:
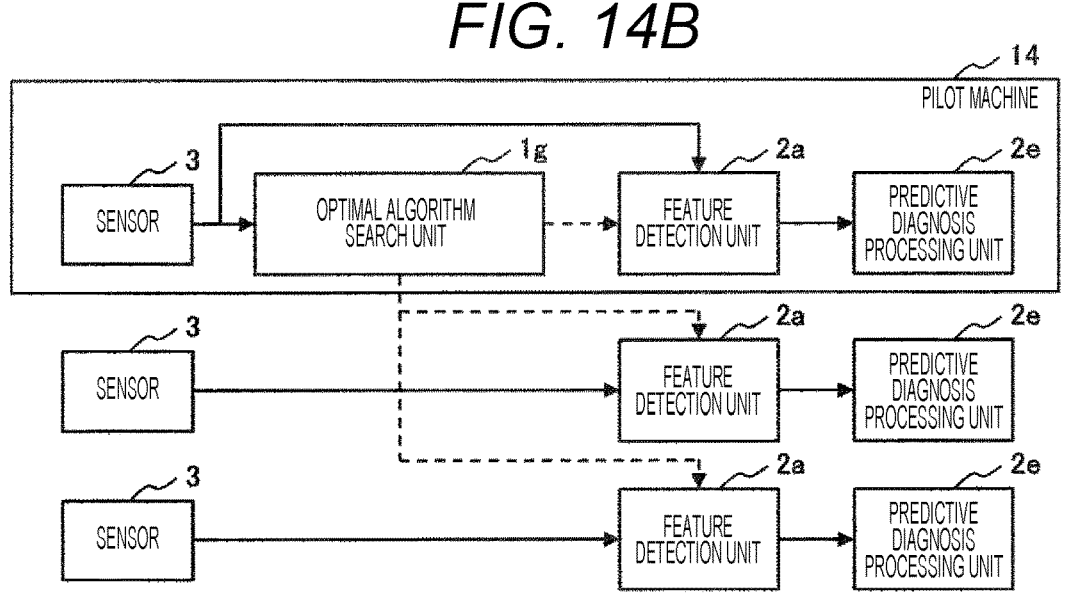
FIG. 14B is a connection diagram of second main components of the failure diagnosis system according to the third embodiment.

Further, as shown in FIG. 14B, another configuration may be employed where an algorithm searched for by the optimal algorithm search unit 1g of a pilot machine 14 is distributed to a plurality of diagnosis processing devices 2. According to this configuration, even when there are a plurality of pieces of diagnosis target equipment, and there are a plurality of diagnosis processing devices 2 that perform a diagnosis on the pieces of diagnosis target equipment, an examination result from the pilot machine 14 can be quickly deployed, which in turn makes it possible to increase the accuracy of predictive diagnosis in each of the diagnosis processing devices 2.

Figure 14C:
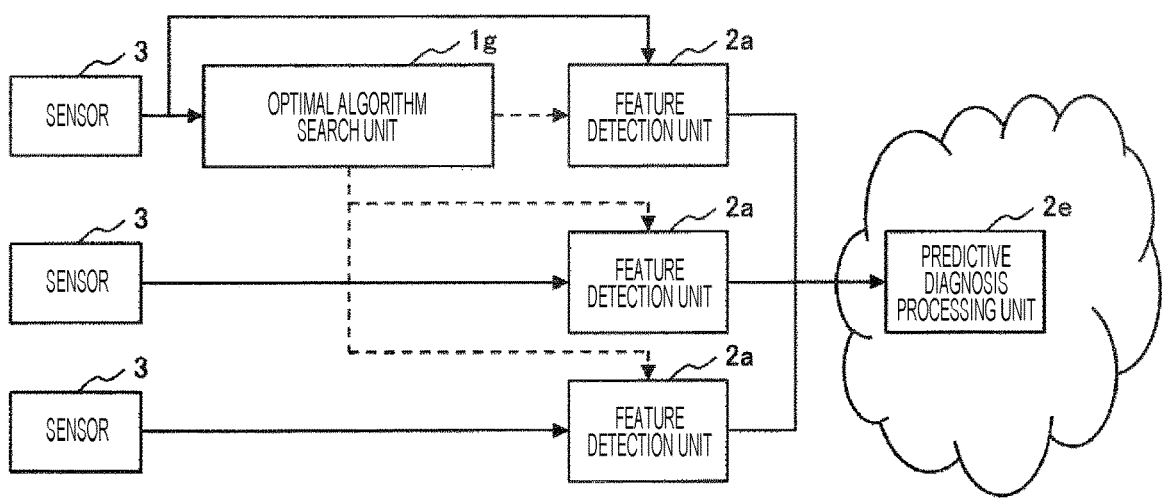
FIG. 14C is a connection diagram of third main components of the failure diagnosis system according to the third embodiment.

Furthermore, as shown in FIG. 14C, another configuration may be employed where the failure diagnosis system 100 performs processing up to feature extraction, and the predictive diagnosis processing unit 2e on a cloud capable of executing a more accurate predictive diagnosis algorithm performs predictive abnormality diagnoses by batch.

REFERENCE SIGNS LIST 100 failure diagnosis system
1 optimal algorithm search device
2 diagnosis processing device
10a, 20a central control device
10b, 20b input device
10c, 20c output device
10d, 20d communication device
10e secondary storage device
10f, 20e primary storage device
3 sensor
5a analog circuit block
5b digital circuit block
23 communication channel
24 storage and diagnosis processing device on network
30 air compressor
30a air compressor body
30b rotary machine
30c power supply
30d bearing
30e acceleration sensor
30f current sensor

The invention claimed is:

1. A failure diagnosis system configured to diagnose a sign predictive of failure of diagnosis target equipment, comprising:
a sensor configured to acquire measurement data from the diagnosis target equipment;
a pre-maintenance data DB where the measurement data before maintenance acquired by the sensor is stored;
a post-maintenance data DB where the measurement data after maintenance acquired by the sensor is stored;
a feature detection algorithm group DB where a plurality of feature detection algorithms are stored;
a first feature detection unit configured to detect a feature based on the measurement data by using each of the plurality of feature detection algorithms read from the feature detection algorithm group DB;
an algorithm search unit configured to select one of the plurality of feature detection algorithms based on the feature detected by using each of the plurality of feature detection algorithms;
a second feature detection unit configured to detect a feature from the measurement data by using the feature detection algorithm selected by the algorithm search unit; and
a predictive diagnosis processing unit configured to diagnose a sign predictive of failure of the diagnosis target equipment by using the feature output from the second feature detection unit,
wherein the algorithm search unit compares a feature based on the measurement data before maintenance and a feature based on the measurement data after maintenance to select one of the plurality of feature detection algorithms.

2. The failure diagnosis system according to claim 1, wherein the second feature detection unit holds a plurality of feature detection algorithms beforehand, and determines a feature detection algorithm to be used in accordance with algorithm change information corresponding to the feature detection algorithm selected by the algorithm search unit.

3. The failure diagnosis system according to claim 1, wherein the second feature detection unit includes a reconfigurable large scale integration (LSI) chip, and reconfigures the LSI chip in accordance with algorithm change information corresponding to the feature detection algorithm selected by the algorithm search unit.

4. The failure diagnosis system according to claim 1, wherein the pre-maintenance data DB, the post-maintenance data DB, the feature detection algorithm group DB, the first feature detection unit, and the algorithm search unit are installed in an optimal algorithm search device, and the second feature detection unit and the predictive diagnosis processing unit are installed in a diagnosis processing device.

5. The failure diagnosis system according to claim 1, wherein the pre-maintenance data DB, the post-maintenance data DB, the feature detection algorithm group DB, the first feature detection unit, the algorithm search unit, the second feature detection unit, and the predictive diagnosis processing unit are installed in a single device.

6. The failure diagnosis system according to claim 5, wherein the feature detection algorithm selected by the algorithm search unit is applied to the second feature detection unit installed in a different diagnosis processing device.

7. The failure diagnosis system according to claim 1, wherein the predictive diagnosis processing unit is installed on a cloud.

* * * * *